(12) United States Patent
Baldwin

(10) Patent No.: US 9,554,195 B2
(45) Date of Patent: Jan. 24, 2017

(54) METHOD AND APPARATUS FOR TARGETED ADVERTISING WITH DELIVERY OF CONTENT

(71) Applicant: AT&T Intellectual Property I, LP, Atlanta, GA (US)

(72) Inventor: Christopher Baldwin, Algonquin, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 112 days.

(21) Appl. No.: 14/529,259

(22) Filed: Oct. 31, 2014

(65) Prior Publication Data
US 2016/0127801 A1    May 5, 2016

(51) Int. Cl.
| | | |
|---|---|---|
| H04N 21/81 | (2011.01) | |
| H04N 21/234 | (2011.01) | |
| H04N 21/258 | (2011.01) | |
| H04N 21/2668 | (2011.01) | |
| H04N 21/41 | (2011.01) | |
| H04N 21/458 | (2011.01) | |
| H04N 21/462 | (2011.01) | |
| H04N 21/61 | (2011.01) | |
| H04N 21/858 | (2011.01) | |

(52) U.S. Cl.
CPC ...... *H04N 21/812* (2013.01); *H04N 21/23424* (2013.01); *H04N 21/258* (2013.01); *H04N 21/25866* (2013.01); *H04N 21/25883* (2013.01); *H04N 21/2668* (2013.01); *H04N 21/4126* (2013.01); *H04N 21/458* (2013.01); *H04N 21/4622* (2013.01); *H04N 21/6131* (2013.01); *H04N 21/858* (2013.01)

(58) Field of Classification Search
CPC ............ H04N 21/23424; H04N 5/2723; H04N 21/258; H04N 21/25883; H04N 21/2668; H04N 21/812
See application file for complete search history.

(56) References Cited

U.S. PATENT DOCUMENTS

| | | |
|---|---|---|
| 7,640,562 B2 | 12/2009 | Bouilloux-Lafont et al. |
| 8,156,520 B2 | 4/2012 | Casagrande et al. |
| 8,434,103 B2 | 4/2013 | Tsuchida et al. |
| 8,561,104 B1 | 10/2013 | Dow et al. |
| 8,572,639 B2 | 10/2013 | Ficco |
| 2002/0138831 A1* | 9/2002 | Wachtfogel .............. H04N 5/76 725/32 |
| 2003/0188308 A1 | 10/2003 | Kizuka |
| 2009/0171780 A1 | 7/2009 | Aldrey et al. |
| 2009/0210901 A1 | 8/2009 | Hawkins et al. |

(Continued)

*Primary Examiner* — Rong Le
(74) *Attorney, Agent, or Firm* — Guntin & Gust, PLC; Ralph Trementozzi

(57) ABSTRACT

Aspects of the subject disclosure may include, for example, receiving, over a multicast-broadcast single-frequency network channel of a cellular network, a second advertisement provided by an advertisement server; providing the second advertisement to a media processor to cause the media processor to replace a first advertisement with the second advertisement during presentation of media content received by the media processor over a first network, where the second advertisement is selected from a group of advertisements according to user data of a user of the media processor. Other embodiments are disclosed.

20 Claims, 7 Drawing Sheets

(56) References Cited

U.S. PATENT DOCUMENTS

| | | |
|---|---|---|
| 2011/0219402 A1 | 9/2011 | Candelore et al. |
| 2011/0225046 A1 | 9/2011 | Eldering et al. |
| 2012/0117584 A1 | 5/2012 | Gordon |
| 2012/0144420 A1* | 6/2012 | Del Sordo .......... H04N 21/2668 725/35 |
| 2012/0330756 A1 | 12/2012 | Morris et al. |
| 2014/0189732 A1* | 7/2014 | Shkedi ............... H04N 21/4524 725/34 |
| 2015/0007218 A1* | 1/2015 | Neumann ........ H04N 21/23424 725/32 |
| 2015/0149279 A1* | 5/2015 | Kotecha ............. G06Q 30/0255 705/14.53 |

* cited by examiner

100

200

300

400

METHOD AND APPARATUS FOR TARGETED ADVERTISING WITH DELIVERY OF CONTENT

FIELD OF THE DISCLOSURE

The subject disclosure relates to a method and apparatus for targeted advertising with delivery of content.

BACKGROUND

Broadcast media provides content to a large group of users, but does not lend well to targeted advertisement to those users or groups of those users. The advertisements provided with the broadcast can be selected based on the type of content being broadcast or the particular geographic area in which the broadcast occurs. But, selecting the advertisements to vary between households receiving the broadcast is difficult.

BRIEF DESCRIPTION OF THE DRAWINGS

Reference will now be made to the accompanying drawings, which are not necessarily drawn to scale, and wherein.

DETAILED DESCRIPTION

Figure 1:
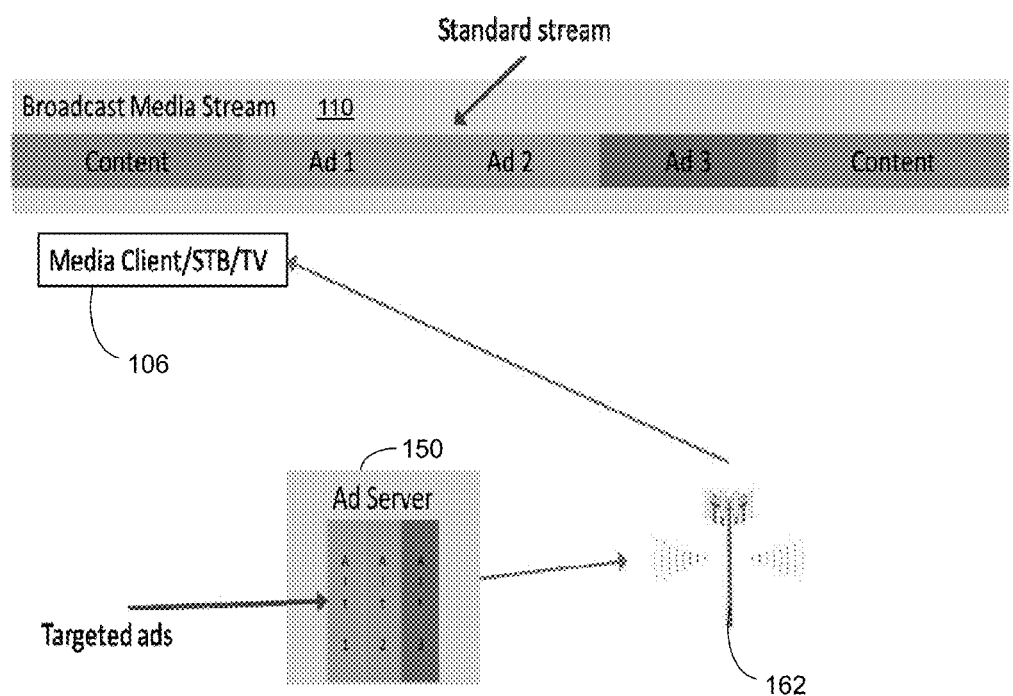
FIGS. 1-3 depict illustrative embodiments of communication systems that provide content and target advertisements to one or more users.

The subject disclosure describes, among other things, illustrative embodiments for delivering advertisements that are targeted to a user or group of users and which can be inserted in place of advertisements delivered in a media stream. Other embodiments are described in the subject disclosure.

One or more aspects of the subject disclosure include providing delivery of content and target advertisements to one or more users. In one embodiment, the delivery of the content (with or without first advertisements) can be over a first network and the delivery of the target advertisements can be over a second network. The second network can be a multicast-broadcast single-frequency network.

In one embodiment, the targeted advertisements can be used with on demand and/or delayed viewing. For example, the targeted advertisements can be obtained over a cellular network and either inserted during playback or recorded in place of the standard advertisements in the media stream.

In one embodiment, the target advertisements can be obtained during playback rather than during a broadcast. In another embodiment, context can be used in the advertisement selection process where the viewer context during playback is different than during the initial broadcast. In another embodiment, different targeted advertisements can be selected each time the same recording is viewed. For example, a recorded show may be viewed by one person with a first set of targeted advertisements and viewed a second time by another person with a second set of targeted advertisements. In this example, the set top box may determine who the viewer is (e.g., according to content being viewed or other detection techniques) and can select the corresponding advertisements based on the determination of the user.

One embodiment of the subject disclosure includes a media processor that has a processor circuit, and a memory that stores executable instructions that, when executed by the processor circuit, facilitate performance of operations, including receiving, over a first network, a content stream comprising media content and a first advertisement. The processor circuit can receive, via a cellular receiver, a second advertisement that is provided by an advertisement server over a multicast-broadcast single-frequency network channel of a cellular network. The processor circuit can replace the first advertisement with the second advertisement. The processor circuit can present, via a display, the media content and the second advertisement, where the second advertisement is selected from a group of advertisements according to user data of a user of the media processor.

One embodiment of the subject disclosure is a method including providing, by a system including a processor, a content stream to a media processor over a first network where the content stream comprises media content and a first advertisement. The method includes obtaining, by the system, a second advertisement from an advertisement server. The method includes providing, by the system to a cellular receiver, the second advertisement over a cellular network, where the cellular receiver is in communication with the media processor, and where the providing of the second advertisement causes the media processor to replace the first advertisement with the second advertisement and to present the media content and the second advertisement.

One embodiment of the subject disclosure includes a machine-readable storage device, comprising executable instructions that, when executed by a processor of a mobile communication device, facilitate performance of operations, including receiving, over a multicast-broadcast single-frequency network channel of a cellular network, a second advertisement provided by an advertisement server. The operations include providing the second advertisement to a media processor to cause the media processor to replace a first advertisement with the second advertisement during presentation of media content received by the media processor over a first network, where the second advertisement is selected from a group of advertisements according to user data of a user of the media processor.

FIG. 1 depicts an illustrative embodiment of a system 100 that enables advertisement content to be targeted to particular users or groups of users. System 100 can include a media processor (e.g., a set top box or a television with a processor integrated therein) that receives a media stream 110 which includes media content and advertisements. The media stream 110 can be received over various networks, such as an Internet Protocol Television Network, a cable network, a satellite network an over-the-air network and/or any other network that provides television or video services. The media stream 110 can be received by broadcast, multicast, or unicast.

The system 100 can include an advertisement server 150 that is in communication with the media processor 106 via a cellular receiver of the media processor 106 over a cellular network 162. In one embodiment, one or more advertisements from the media stream 110 can be replaced with one or more advertisements received from the advertisement server. In one embodiment, the advertisement server 150 can select the second advertisement from a group of advertisements based on various criteria that enables targeting the user of the media processor or targeting a group of users that includes the user of the media processor. As an example, the advertisement server 150 can obtain or otherwise retrieve user data of the user of the media processor. The user data can include a location of the media processor, a user profile, user preferences of the user determined from a history of content consumption at the media processor, a purchasing history of the user, and so forth. Based upon this user data, the advertisement server can determine or otherwise select target advertisements that are more likely to persuade the user to make a purchase.

In another embodiment, the media processor 106 can further filter or otherwise select advertisement(s) for insertion into the media stream 110 in place of the advertisements that were received in the media stream. As an example, the advertisement server 150 can receive first user data associated with the user and a selection of target advertisements can be made based on the first user data. The target advertisements can then be provided to the media processor 106 via cellular network 162 and the media processor can select a subset of the target advertisements based on second user data. In one embodiment, the first user data can be lower confidentiality data that the user is willing to share with the advertisement server 150 while the second user data is higher confidentiality data that the user maintains at the media processor 106. In another embodiment, the first user data can be an aggregation of data from different users (e.g., in a geographic area) and the second user data can be associated with the particular user. In this example, the cellular network 162 is utilized to deliver targeted advertisements to a group of users in a service area and then individual media processors can further filter the selected advertisements to target individual users within the service area. In one embodiment, the cellular network can utilize a Multimedia Broadcast multicast service Single Frequency Network (MBSFN) for delivering the target advertisements to the media processor 106 and the service area can correspond to an MBSFN area.

In one embodiment, the cellular network 162 utilizes a communication channel of an MBSFN (e.g., a Long Term Evolution (LTE) broadcast). The MBSFN communications enable multiple users to receive the same content simultaneously. MBSFN is a transmission mode that can utilize an OFDM radio interface to send multicast or broadcast data as a multi-cell transmission over a synchronized single-frequency network (SFN). The transmissions from the multiple cells can be sufficiently synchronized so that each arrives at the end user device within the OFDM cyclic prefix so as to avoid inter-symbol interference.

For example, an LTE broadcast over cellular network 162 can deliver the same targeted advertisements to multiple users. In one embodiment, the cellular network 162 can utilize eMBMS (Evolved Multimedia Broadcast Multicast Service) to deliver the target advertisements via broadcast/multicast services. In another embodiment, the cellular network 162 can utilize High Efficiency Video Coding (HEVC) for video compression to deliver the target advertising. In yet another embodiment, the cellular network 162 utilizes MPEG Dynamic Adaptive Streaming over HTTP (DASH) in the delivery of the targeted advertising.

As an example, the eMBMS service can transmit the advertisements only into where there currently are viewers. In one embodiment, the eMBMS service provides for the target advertisements being only transmitted once in each cell. In another embodiment, the cellular network 162 utilizes Dynamic Single Frequency Networks (DSFN), which dynamically form single-frequency networks (SFNs), i.e. groups of adjacent base stations that send the same signal simultaneously on the same frequency sub-carriers, when there are intended recipients the same targeted advertising in the adjacent cells.

The eMBMS service can send the target advertisements to all users in a cell (broadcast) or to a given set of users in a cell (multicast) using a subset of the available radio resources with the remaining available to support transmissions towards a particular user (unicast services). The eMBMS service is different from IP-level broadcast or multicast, which offer no sharing of resources on the radio access level. In eMBMS service, it is possible to either use a single eNode-B or multiple eNode-Bs (via MBSFN) for transmission to multiple end user devices.

The cellular network 162 can utilize MBMS service including an MBMS Bearer Service and an MBMS User Service, and can be offered over UTRAN (i.e., WCDMA, TD-CDMA and TD-SCDMA) and LTE. The MBMS Bearer Service can include a Multicast and/or a Broadcast Mode. The MBMS Bearer Service can use IP multicast addresses for the IP flows. The MBMS Bearer Service can share the transmission resources in the core- and radio network. For example, one MBMS packet flow can be replicated by GGSN, SGSN and RNCs.

In one embodiment, the media processor 106 can detect an advertisement trigger in the content stream and, responsive to the detecting of the advertisement trigger, can transmit an advertisement request over the cellular network 162 to the advertisement server 150. The receiving of the target advertisements by the media processor 106 can be responsive to the advertisement request. In another embodiment, the media processor 106 can detect a delay in receiving a target advertisement from the advertisement server 150 and can then present one of the advertisements from the media stream 110 responsive to the detecting of the delay.

The target advertisement can be sent via cellular network 162 according to a synchronization of the advertisement server 150 and a content server (not shown) providing the content stream 110 to the media processor 106. In one embodiment, the synchronization is based on a synchronization signal provided to the advertisement server 150.

Figure 2:
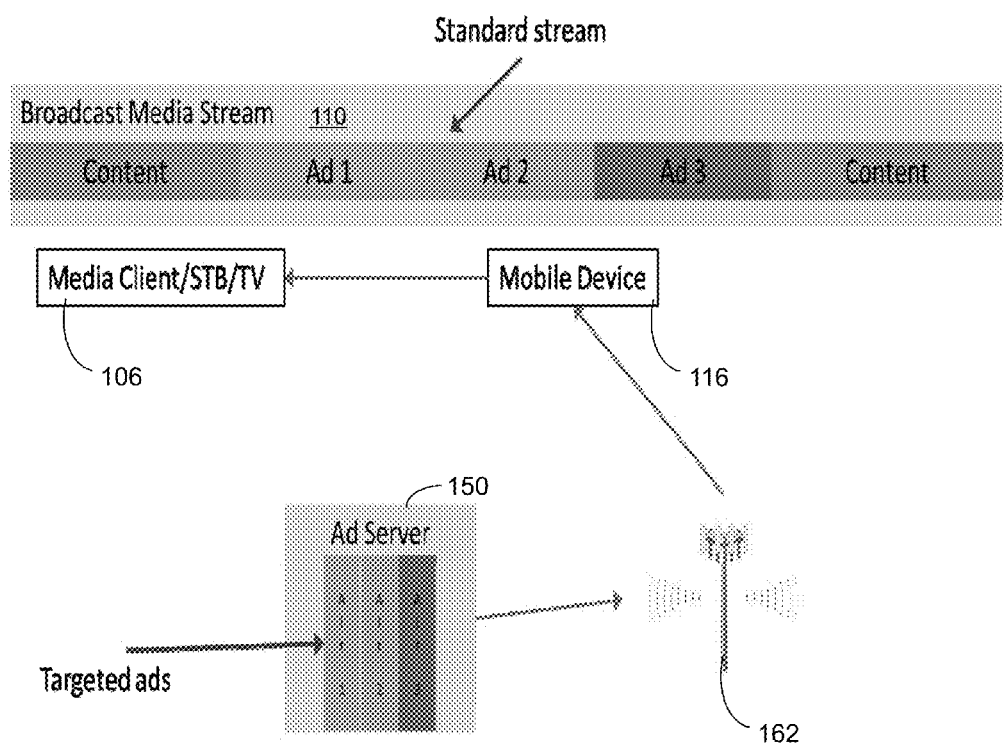

FIG. 2 depicts an illustrative embodiment of a system 200 in which the media processor 106 receives the target advertisements from the advertisement server 150 by way of a cellular receiver/transmitter 116 that is a separate device from the media processor. For example, a mobile smart phone device 116 can receive the target advertisements over cellular network 162 and can transmit the target advertisements (or a filtered portion thereof) to the media processor 106. In one embodiment, the transmission of the target advertisements from the mobile device 116 to the media processor 106 can be according to a short-distance wireless protocol, such as Bluetooth or WiFi. In another embodiment, the mobile device 116 can filter the received target advertisements and provide only a subset to the media processor. The filtering can be based on various factors, including user data of the user.

In one embodiment, the mobile device 116 can be associated with the same user as the media processor 106. In another embodiment, the mobile device 116 can be associated with different users. In one embodiment, the media processor 106 can detect the presence of the mobile device 116 and can request the target advertisements via the mobile device over the cellular network 162.

Figure 3:
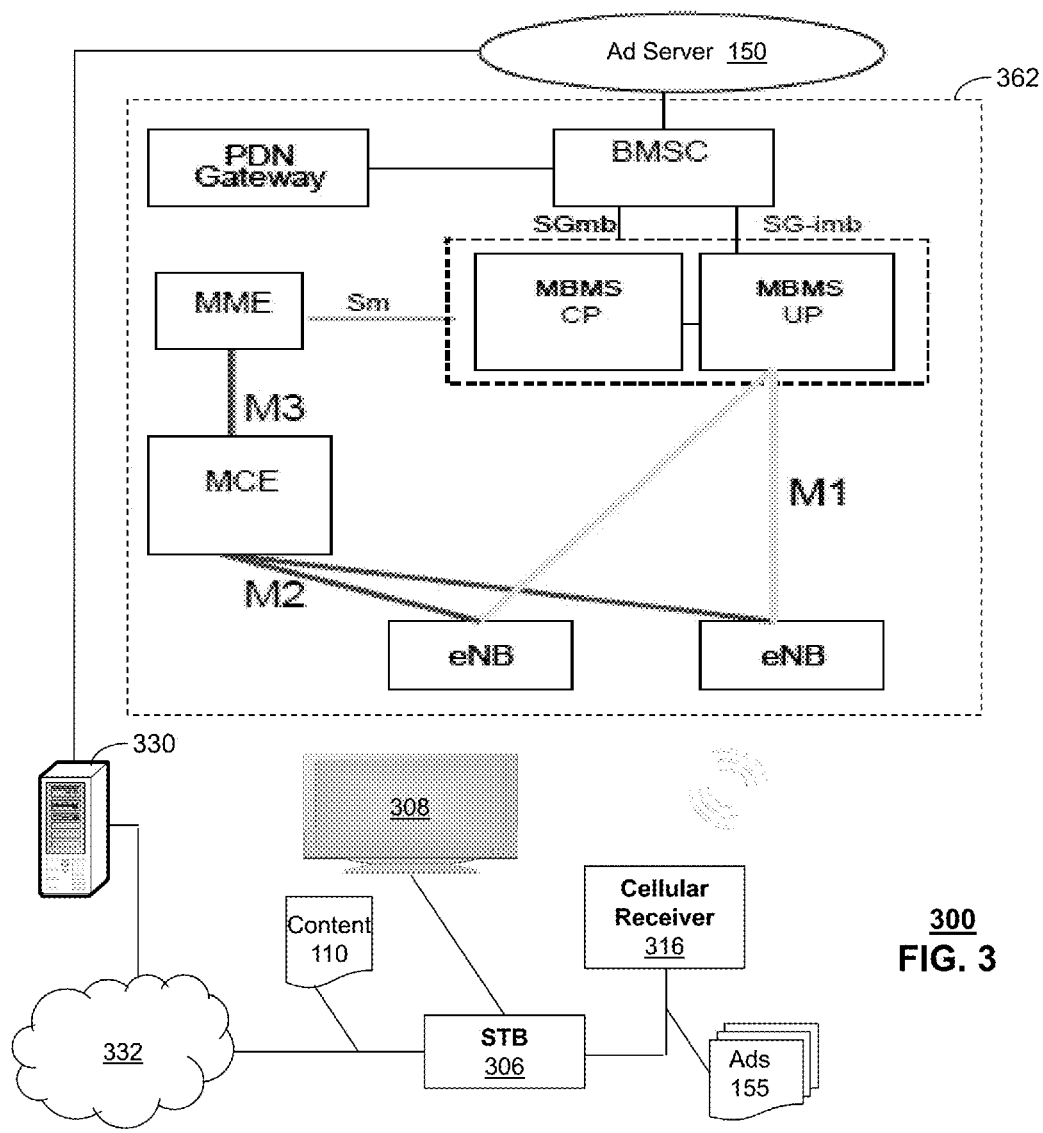

FIG. 3 depicts an illustrative embodiment of a system 300 in which a media processor 306 (e.g., a set top box) receives content 110 over a network 332 from a content source 330 and receives advertisements 155 from a cellular receiver 316. The cellular receiver 316 can be integrated with the set top box 306 or can be a separate device from the set top box, such as a mobile device, a tablet, or a desktop computer.

In one embodiment, the cellular receiver 316 can receive target advertisements 155 over a multicast-broadcast single-frequency network channel of a cellular network from the advertisement server 150. Various network elements can be utilized in establishing the multicast-broadcast single-frequency network channel including e-nodeBs, a Multicell Coordination Entity (MCE), a Mobility Management Entity (MME), a Packet Data Network (PDN) gateway, and a Broadband Messaging Service Center (BMSC). The set top box 306 can replace advertisements in the media content 110 with advertisements 155. In one embodiment, the advertisements 155 are selected from a group of advertisements according to user data of a user of the set top box.

In one embodiment, the content source 330 and the advertisement server 150 can be in communication with each other so that the advertisements 155 can be synchronized for delivery with the media content 110. In one embodiment, an advertisement request can be transmitted from the set top box 306 responsive to a detection of an advertisement trigger in the media content 110. The advertisement request can be transmitted over a cellular network channel which may not be a channel different from the multicast-broadcast single-frequency network channel over which the advertisements 155 are received.

The set top box 306 can present the media content 110 and the advertisements 155 at a display device 308.

Figure 4:
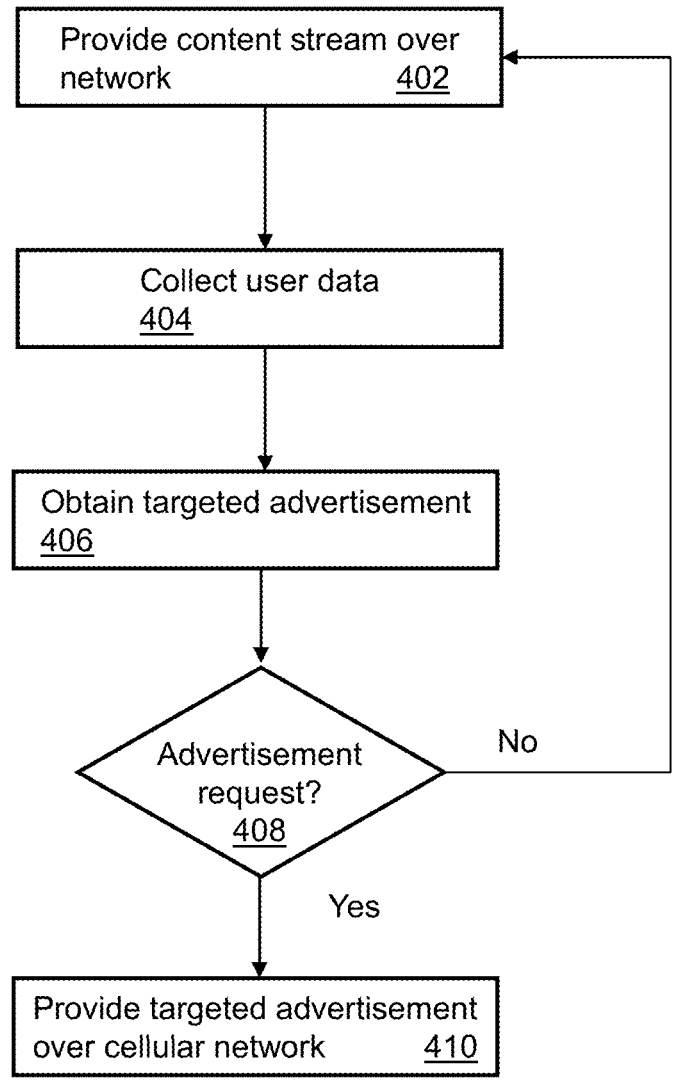
FIG. 4 depicts an illustrative embodiment of a method used in portions of the system described in FIGS. 1-3.

FIG. 4 depicts an illustrative embodiment of a method used by systems 100-300 for delivering targeted advertising that can be inserted or otherwise included in content streams, such as broadcast content, unicast content or multicast content. At 402, a content stream can be provided to a media processor over a first network. For example, the first network can be an IPTV network, a cable network, and/or a satellite network that provides communication services to end user device, including set top boxes and so forth. The content stream can include media content (e.g., video and/or audio content) and one or more first advertisements. In one embodiment at 404, user data, such as user preferences, user profiles, media consumption histories, user demographics and/or other data can be collected or otherwise accessed to facilitate a selection of one or more advertisements (i.e., second advertisements) from among a group of advertisements, such as by an advertisement server or another network device. The second advertisements can be targeted advertisements that are customized to a user or users of a set top box or other media processor that will be presenting the media content.

At 406, the selected second advertisement(s) can be received or otherwise obtained from an advertisement server. If at 408, an advertisement request is detected or otherwise determined (e.g., received from the media processor or received from a content source providing the media content) then the targeted advertisement can be provided over a cellular network for receipt by the media processor. In one embodiment, the providing of the target advertisements to the media processor causes the media processor to replace advertisement(s) in the media stream with the target advertisements.

In one embodiment, cellular network can provide a multicast-broadcast single-frequency network channel. In another embodiment, the target advertisements can be selected by the advertisement server from a group of advertisements according to a location of the media processor, user preferences determined from a history of content consumption at the media processor, a user profile of a user of the media processor, demographics of the user, or a combination thereof. In one embodiment, synchronization data can be provided to enable synchronizing of the advertisement server with the providing of the content stream to the media processor. In one embodiment, the providing of the content stream to the media processor over the content network is via a broadcast.

Figure 5:
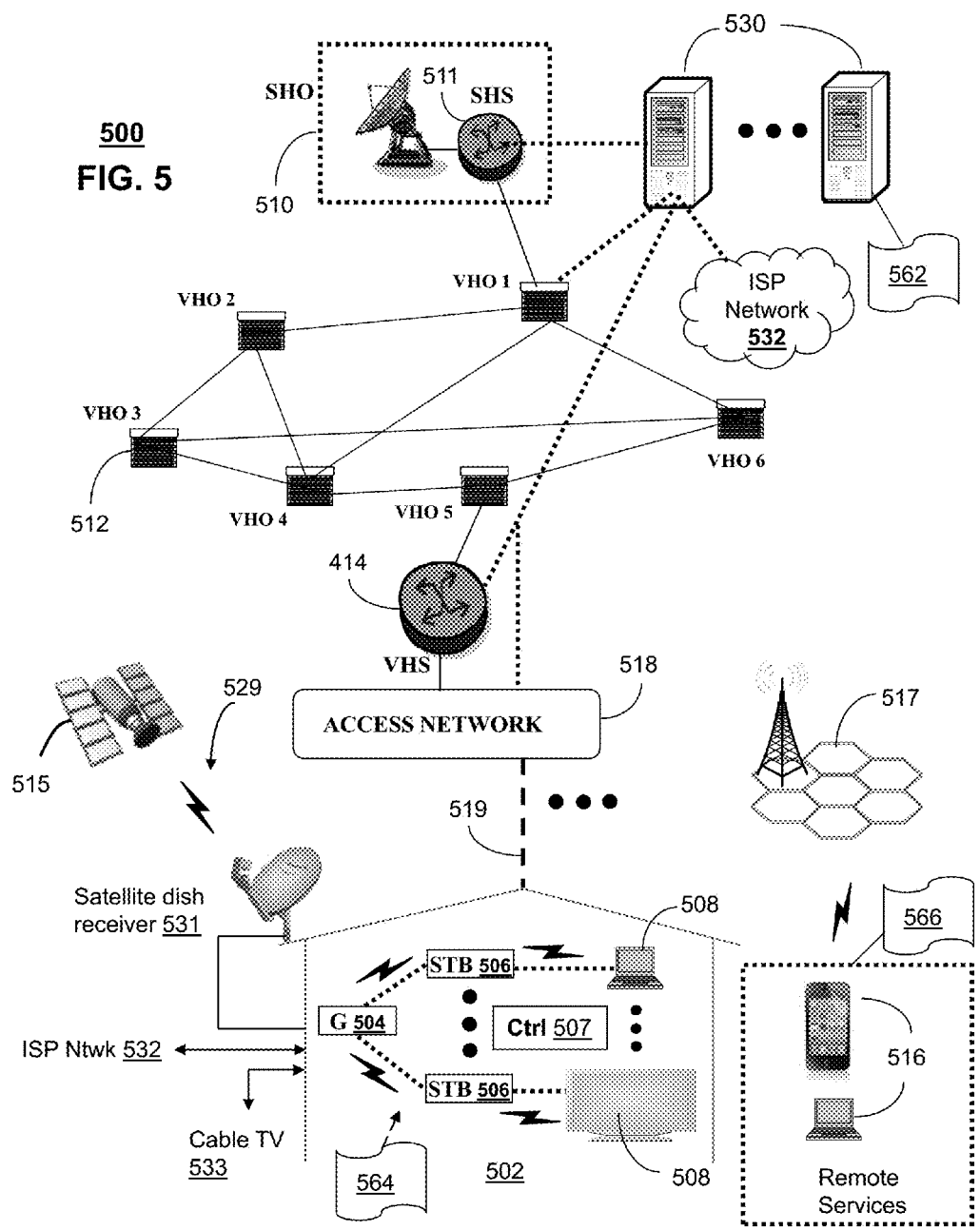
FIG. 5 depicts an illustrative embodiment of a communication system that provides media services over a first network and target advertisements via a cellular network.

FIG. 5 depicts an illustrative embodiment of a communication system 500 for delivering media content and delivering target advertisements. The communication system 500 can represent an Internet Protocol Television (IPTV) media system. Communication system 500 can be overlaid or operably coupled with system 100-300 as another representative embodiment of communication system 500. For instance, one or more devices illustrated in the communication system 500 of FIG. 5 can receive, over a multicast-broadcast single-frequency network channel of a cellular network, a second advertisement provided by an advertisement server; and can provide the second advertisement to a media processor to cause the media processor to replace a first advertisement with the second advertisement during presentation of media content received by the media processor over a first network, where the second advertisement is selected from a group of advertisements according to user data of a user of the media processor.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee® or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

The subject disclosure can apply to other present or next generation over-the-air and/or landline media content services system. Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as an advertisement server (herein referred to as server 530). The server 530 can use computing and communication technology to perform function 562, which can include among other things, providing a content stream to a media processor over a first network, wherein the content stream comprises media content and a first advertisement; obtaining a second advertisement from an advertisement server; and providing the second advertisement over a cellular network to a media processor where the providing of the second advertisement causes the media processor to replace the first advertisement with the second advertisement and to present the media content and the second advertisement.

For instance, function 562 of server 530 can be similar to the functions described for servers 150 and 330 of FIGS. 1-2 in accordance with method 400. The media processors 506 and wireless communication devices 516 can be provisioned with software functions 564 and 566, respectively, to utilize the services of server 530. For instance, functions 564 and 566 of media processors 506 and wireless communication devices 516 can be similar to the functions described for the devices 106, 116, 306 and 316 of FIGS. 1-3 in accordance with method 400.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
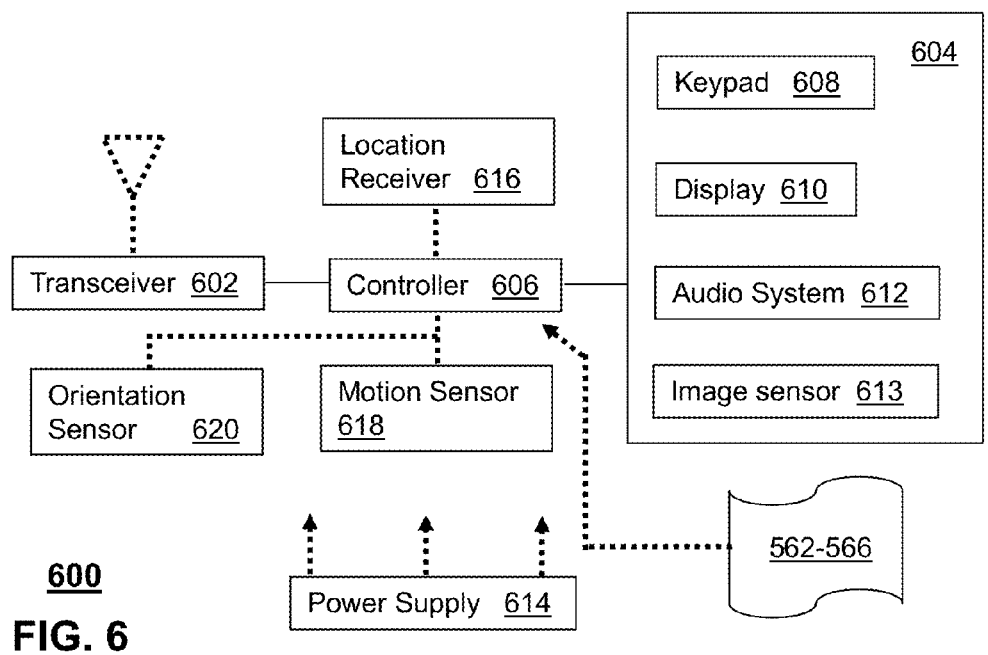
FIG. 6 depicts an illustrative embodiment of a communication device.

FIG. 6 depicts an illustrative embodiment of a communication device 600. Communication device 600 can serve in whole or in part as an illustrative embodiment of the devices depicted in systems 100-300 of FIGS. 1-3 and 500 of FIG. 5 and can be configured to perform portions of method 400 of FIG. 4.

For example, communication device 600 can be a media processor that provides video services, including broadcast, multicast and/or unicast services. Communication device 600 can have a cellular receiver and/or transmitter integrated therein or can be in communication with a separate cellular receiver and/or transmitter. Communication device 600 can receive, over a first network (e.g., an IPTV network, a cable network, a satellite network), a content stream comprising media content and a first advertisement; receive, via a cellular receiver, a second advertisement that is provided by an advertisement server over a multicast-broadcast single-frequency network channel of a cellular network; replace the first advertisement with the second advertisement; and present, via a display, the media content and the second advertisement, where the second advertisement is selected from a group of advertisements according to user data of a user of the media processor.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices 106, 116, 150, 306, 316, and 330, the media processor 506, the media devices 508, or the portable communication devices 516. It will be appreciated that the communication device 600 can also represent other devices that can operate in systems 100-300, and/or communication system 500 of FIG. 5, such as a gaming console and a media player. In addition, the controller 606 can be adapted in various embodiments to perform the functions 562-566, respectively.

Upon reviewing the aforementioned embodiments, it would be evident to an artisan with ordinary skill in the art that said embodiments can be modified, reduced, or enhanced without departing from the scope of the claims described below. For example, the selection of the target advertisements can be based on success in advertising to the particular user. For example, purchase transactions for the user of the media processor can be monitored and correlated with target advertisements that were delivered. This correlation can be used to select further target advertisements, such as in the same product class or the same style of advertisement.

In one embodiment, the target advertising can include revenue sharing between the service provider and the advertiser and/or retailer. In another embodiment, the delivery of the advertisements can be prior to the delivery of the media stream and the set top box can determine where to insert the target advertisements. In another embodiment, the delivery of the target advertisements over the cellular network can include determining transmission time based on various factors such as network congestion. In one embodiment, training signals can be utilized to facilitate synchronizing the delivery of the target advertisements with the media stream, such as adding training signals to a satellite signal that enables measuring time of transmission between various elements including advertisement server to set top box and satellite transmission.

In one embodiment, the delivery can be to media processor located at a venue (e.g., a stadium) where targeted advertisement is correlated with merchants in the particular area of the venue. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
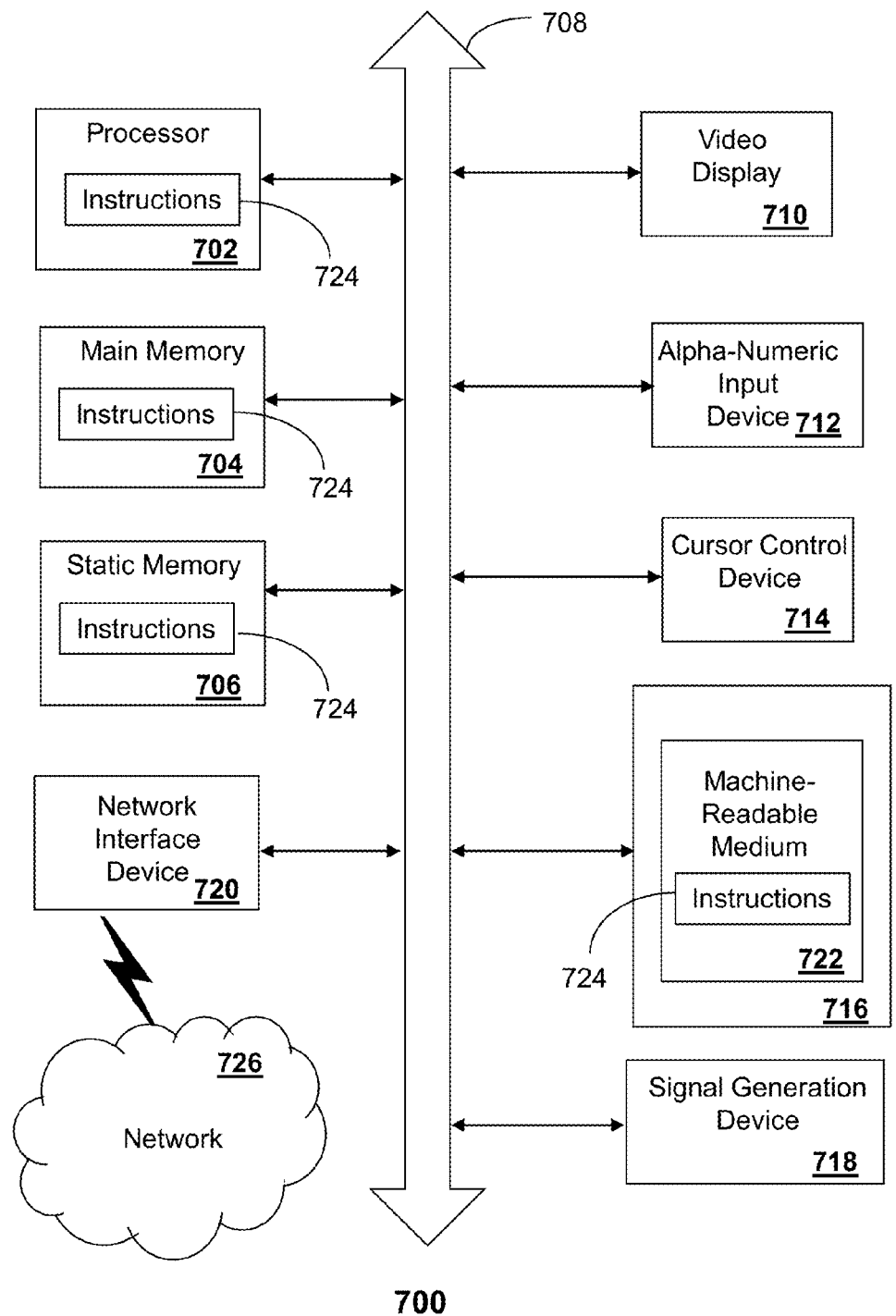
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the devices 106, 116, 150, 306, 316, and 330, the media processor 506, the media devices 508, or the portable communication devices 516. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor comprising:
a processing system comprising a processor; and
a memory that stores executable instructions that, when executed by the processing system, facilitate performance of operations, comprising:
receiving, over a first network, a content stream comprising media content and a first advertisement;
receiving, via a cellular receiver, a second advertisement that is provided by an advertisement server over a multicast-broadcast single-frequency network channel of a cellular network;
replacing the first advertisement with the second advertisement;
presenting, via a display, the media content and the second advertisement,
wherein the second advertisement is selected from a group of advertisements according to user data of a user of the media processor,
wherein the content stream comprises a third advertisement, and wherein the operations further comprise presenting, via the display, the third advertisement; and
detecting a delay in receiving, via the cellular receiver, a fourth advertisement that is provided by the advertisement server over the multicast-broadcast single-frequency network channel of the cellular network, wherein the third advertisement is presented via the display instead of the fourth advertisement responsive to the detecting of the delay.

2. The media processor of claim 1, wherein the user data comprises a location of the media processor and user preferences of the user determined from a history of content consumption at the media processor.

3. The media processor of claim 2, wherein the receiving of the content stream is via a broadcast of the content stream over the first network, wherein the cellular receiver is integrated with the media processor, and wherein the operations further comprise:
detecting an advertisement trigger in the content stream; and
responsive to the detecting of the advertisement trigger, transmitting an advertisement request over the cellular network to the advertisement server,
wherein the receiving of the second advertisement is responsive to the advertisement request.

4. The media processor of claim 1, wherein the receiving of the second advertisement that is provided by the advertisement server over the multicast-broadcast single-frequency network channel of the cellular network is according to a synchronization of the advertisement server and a content server providing the content stream over the first network.

5. The media processor of claim 4, wherein the synchronization is based on a synchronization signal provided to the advertisement server.

6. The media processor of claim 1, wherein the receiving of the content stream is via a unicast or multicast of the content stream over the first network.

7. The media processor of claim 1, wherein the receiving of the second advertisement is from a mobile communication device that receives the second advertisement from the advertisement server over the multicast-broadcast single-frequency network channel of the cellular network.

8. The media processor of claim 7, wherein the cellular receiver is integrated with the mobile communication device.

9. The media processor of claim 1, wherein the operations further comprise:
receiving, via the cellular receiver, a group of second advertisements that is provided by the advertisement server over the multicast-broadcast single-frequency network channel of the cellular network.

10. The media processor of claim 9, wherein the operations further comprise:
selecting the second advertisement from among the group of second advertisements.

11. The media processor of claim 10, wherein the selecting of the second advertisement from among the group of second advertisements is according to a location of the media processor, user preferences of the user determined from a history of content consumption at the media processor, a user profile of the user, demographics of the user, or a combination thereof.

12. A method comprising:
providing, by a processing system including a processor, a content stream to a media processor over a first network, wherein the content stream comprises media content and a first advertisement;
obtaining, by the processing system, a second advertisement from an advertisement server;
providing, by the processing system to a cellular receiver, the second advertisement over a cellular network;
wherein the cellular receiver is in communication with the media processor, and
wherein the providing of the second advertisement causes the media processor to replace the first advertisement with the second advertisement and to present the media content and the second advertisement,
wherein the content stream comprises a third advertisement;
presenting, via a display, the third advertisement; and
detecting, by the processing system, a delay in receiving, via the cellular receiver, a fourth advertisement that is provided by the advertisement server over the cellular network, wherein the third advertisement is presented via the display instead of the fourth advertisement responsive to the detecting of the delay.

13. The method of claim 12, wherein the providing of the second advertisement to the cellular receiver is via a multicast-broadcast single-frequency network channel of the cellular network.

14. The method of claim 12, wherein the second advertisement is selected from a group of advertisements according to a location of the media processor, user preferences determined from a history of content consumption at the media processor, a user profile of a user of the media processor, demographics of the user, or a combination thereof.

15. The method of claim 12, comprising:
providing, by the processing system, an advertisement request to the advertisement server, wherein the obtaining of the second advertisement from the advertisement server is responsive to the advertisement request.

16. The method of claim 12, comprising providing, by the processing system, synchronization data to enable synchronizing of the advertisement server with the providing of the content stream to the media processor.

17. The method of claim 12, wherein the cellular receiver is integrated with a mobile communication device, and
wherein the providing of the second advertisement is to the mobile communication device over a multicast-broadcast single-frequency network channel of the cellular network which causes the mobile communication device to transmit the second advertisement to the media processor.

18. The method of claim 12, wherein the providing of the content stream to the media processor over the first network is via a broadcast, and wherein the cellular receiver is integrated with the media processor.

19. A machine-readable storage device, comprising executable instructions that, when executed by a processing system including a processor of a mobile communication device, facilitate performance of operations, comprising:
receiving, over a multicast-broadcast single-frequency network channel of a cellular network, a second advertisement provided by an advertisement server;
providing the second advertisement to a media processor to cause the media processor to replace a first advertisement with the second advertisement during presentation of media content received by the media processor over a first network,
wherein the second advertisement is selected from a group of advertisements according to user data of a user of the media processor,
wherein the multicast-broadcast single-frequency network channel comprises a third advertisement, and wherein the operations further comprise presenting, via a display, the third advertisement; and
detecting, by the processing system, a delay in receiving, via a cellular receiver, a fourth advertisement that is provided by the advertisement server over the multicast-broadcast single-frequency network channel of the cellular network, wherein the third advertisement is presented via the display instead of the fourth advertisement responsive to the detecting of the delay.

20. The machine-readable storage device of claim 19, wherein the operations further comprise:
receiving an advertisement request from the media processor responsive to a detection by the media processor of an advertisement trigger in the media content; and
transmitting the advertisement request over the cellular network to the advertisement server, wherein the receiving of the second advertisement over the multicast-broadcast single-frequency network channel is responsive to the transmitting of the advertisement request.

* * * * *